J. D. ROWLAND.
SECURITY BOLT FOR VEHICLE WHEEL TIRES.
APPLICATION FILED SEPT. 12, 1910.

1,001,891. Patented Aug. 29, 1911.

WITNESSES
W. P. Burke
John C. Sanders

INVENTOR
John David Rowland

UNITED STATES PATENT OFFICE.

JOHN DAVID ROWLAND, OF BIRMINGHAM, ENGLAND.

SECURITY-BOLT FOR VEHICLE WHEEL-TIRES.

1,001,891.   Specification of Letters Patent.   Patented Aug. 29, 1911.

Application filed September 12, 1910. Serial No. 581,525.

*To all whom it may concern:*

Be it known that I, JOHN DAVID ROWLAND, subject of the King of Great Britain, residing at Watery Lane, Birmingham, England, have invented new and useful Improvements Relating to Security-Bolts for Vehicle Wheel-Tires, of which the following is a specification.

This invention relates to the security bolts employed, more especially, with the pneumatic tires of motor road vehicle wheels, and has for its object to provide an improved combined nut and cover for use with such bolts.

As is well known among users of motor vehicles, security bolts of various lengths are employed with the tires and in consequence a cap or cover adapted for one bolt may be unsuitable, on account of its being too short, for another bolt. To adopt a cap or cover of sufficient length to inclose the longest bolt employed would necessitate a cap of excessive length for the majority of bolts.

This invention comprises the use with an internally screwed portion or nut, of a telescopic tubular cap or cover which can be adapted to suit any of the various projecting lengths of bolts ordinarily met with in practice.

Figure 1:
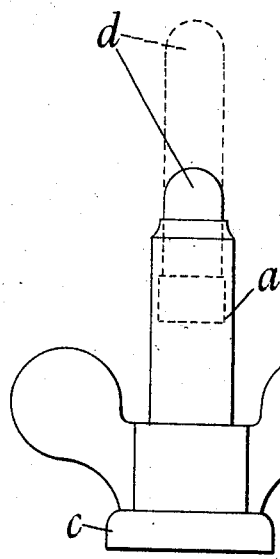
Figure 2:
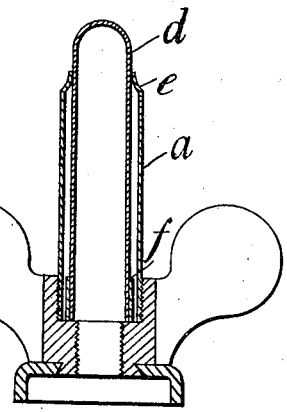
Figure 3:
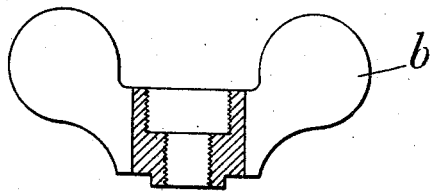
Figure 4:
Figure 5:
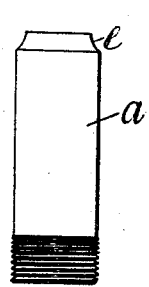
Figure 6:

Referring to the accompanying sheet of explanatory drawings;—Figure 1 is an elevation and Fig. 2 a vertical section of a combined nut and cover constructed in accordance with this invention. Figs. 3 to 6 inclusive show the elements employed.

The same reference letters in the different views indicate the same parts.

In carrying the invention into effect as shown, a brass or other metal tube $a$ is screwed or brazed at one end into a wing nut $b$, the latter being formed with an internally screwed or other recess at its upper side to receive the tube. To the lower side of the nut is rotatably secured a washer $c$ which is attached by spinning over or spreading out a reduced portion at the lower end of the nut as shown. On its under or inner side the metal washer is adapted to receive a leather or other washer as, and for the same purpose as, heretofore. Into the upper open end of the tube $a$ above referred to, another tube $d$ having its outer end closed is inserted and secured against complete withdrawal by compressing or turning in the outer end of the tube $a$ to form a shoulder $e$ which serves as an abutment for a shoulder $f$ on the inner end of the tube $d$.

When the device is screwed into the place of the ordinary nut onto a security bolt, the projecting end of the bolt is inclosed and protected against dust and water. If the said end should be of greater length than can be accommodated by the unextended cover piece, the bolt causes the cover piece to extend (that is, the tube $d$ to be pushed out relatively to the tube $a$) while it is being screwed into position. The device is thus adapted to suit any of the lengths of projecting security bolt ends commonly met with in practice and overcomes the disadvantage of an inextensible cover piece without employing a cover piece the length of which would be excessive for short or medium bolts. In Figs. 1 and 2 the tube $d$ is shown in the inner position. The dotted lines in Fig. 1 indicate an extended position of the said tube.

Having thus described my invention, what I claim as new, and desire to secure by Letters Patent is;—

In caps or covers for the security bolts of vehicle wheel tires, the combination comprising a nut, a washer rotatably attached to the nut, and a pair of tubular portions adapted to inclose without engaging the projecting end of the bolt, one of the said portions being fixed to the nut and the other provided with a closed end and arranged to slide axially within the fixed portion, substantially as described.

In testimony whereof I have signed my name to this specification in the presence of two subscribing witnesses.

JOHN DAVID ROWLAND.

Witnesses:
JOHN MORGAN,
HARRY DAVIS.

---

Copies of this patent may be obtained for five cents each, by addressing the "Commissioner of Patents, Washington, D. C."